US012567188B2

(12) United States Patent
Shimada et al.

(10) Patent No.: US 12,567,188 B2
(45) Date of Patent: Mar. 3, 2026

(54) IMAGE PROCESSING APPARATUS

(71) Applicant: Keyence Corporation, Osaka (JP)

(72) Inventors: Yuma Shimada, Osaka (JP); Manabu Kido, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 129 days.

(21) Appl. No.: 18/589,497

(22) Filed: Feb. 28, 2024

(65) Prior Publication Data

US 2024/0331239 A1 Oct. 3, 2024

(30) Foreign Application Priority Data

Mar. 31, 2023 (JP) ................................. 2023-058153

(51) Int. Cl.
*G06T 11/60* (2006.01)
*G06T 5/50* (2006.01)
*G06T 5/92* (2024.01)

(52) U.S. Cl.
CPC ............... *G06T 11/60* (2013.01); *G06T 5/50* (2013.01); *G06T 5/92* (2024.01); *G06T 2207/20221* (2013.01)

(58) Field of Classification Search
CPC ... G06T 11/60; G06T 5/92; G06T 5/50; G06T 2207/20221
See application file for complete search history.

(56) References Cited

U.S. PATENT DOCUMENTS

| | | | | |
|---|---|---|---|---|
| 6,111,607 | A | * 8/2000 | Kameyama | ............... G06T 5/92 348/E9.042 |
| 8,103,087 | B2 | * 1/2012 | Maeda | .................... G06T 7/001 356/237.1 |
| 8,134,555 | B2 | * 3/2012 | Debevec | ................ G01B 11/25 345/426 |

(Continued)

FOREIGN PATENT DOCUMENTS

JP 2015232478 A 12/2015

OTHER PUBLICATIONS

U.S. Appl. No. 18/589,493, filed Feb. 28, 2024 (41 pages).

*Primary Examiner* — Abderrahim Merouan
(74) *Attorney, Agent, or Firm* — Kilyk & Bowersox, P.L.L.C.

(57) ABSTRACT

An image processing apparatus includes: an imaging unit which generates workpiece images obtained by imaging a workpiece; and an image generation unit which generates an output image having a gradation value in a predetermined gradation range by converting the workpiece images sequentially input from the imaging unit. The image generation unit generates, for each of the input workpiece images, a gradation conversion condition for converting a first gradation value in the input workpiece image into a minimum gradation value in the predetermined gradation range and converting a second gradation value in the workpiece image into a maximum gradation value in the predetermined gradation range, and generates, for each of the input workpiece images, the output image having the gradation value in the predetermined gradation range by performing gradation conversion on each of the gradation values of the workpiece image using the gradation conversion condition corresponding to the workpiece image.

20 Claims, 15 Drawing Sheets

(56) References Cited

U.S. PATENT DOCUMENTS

| | | | | |
|---|---|---|---|---|
| 8,878,929 | B2 * | 11/2014 | Kim | G01B 11/2531 |
| | | | | 348/136 |
| 10,373,305 | B2 * | 8/2019 | Nakao | G06T 7/74 |
| 2005/0123214 | A1 * | 6/2005 | Takahira | G06T 5/75 |
| | | | | 382/266 |
| 2006/0215882 | A1 * | 9/2006 | Ando | H04N 23/70 |
| | | | | 348/E5.073 |
| 2010/0104211 | A1 * | 4/2010 | Hirota | H04N 7/0102 |
| | | | | 382/260 |
| 2011/0128296 | A1 * | 6/2011 | Mihara | G06T 5/94 |
| | | | | 345/428 |
| 2014/0219422 | A1 * | 8/2014 | Nishino | H04N 23/30 |
| | | | | 378/62 |
| 2015/0077541 | A1 * | 3/2015 | Touma | H04N 23/56 |
| | | | | 348/131 |
| 2015/0355103 | A1 * | 12/2015 | Ando | G06T 7/586 |
| | | | | 348/46 |
| 2015/0358602 | A1 * | 12/2015 | Mayumi | H04N 23/56 |
| | | | | 348/46 |
| 2018/0061025 | A1 * | 3/2018 | Ishii | G06T 5/40 |
| 2019/0020784 | A1 * | 1/2019 | Otani | H04N 23/81 |
| 2020/0210540 | A1 * | 7/2020 | Bala | A45D 44/002 |
| 2020/0336661 | A1 * | 10/2020 | Zhang | H04N 5/772 |
| 2021/0109067 | A1 * | 4/2021 | Ito | G01N 29/043 |
| 2021/0193061 | A1 * | 6/2021 | Nakanishi | G09G 3/3607 |
| 2021/0201836 | A1 * | 7/2021 | Nakanishi | G09G 3/3648 |
| 2021/0374923 | A1 * | 12/2021 | Tatae | G06T 5/80 |
| 2021/0383087 | A1 * | 12/2021 | Sato | G06K 5/02 |
| 2022/0264370 | A1 * | 8/2022 | Qiao | H04W 60/00 |
| 2022/0312296 | A1 * | 9/2022 | Chun | H04W 48/02 |
| 2024/0331239 | A1 * | 10/2024 | Shimada | G06T 11/60 |

* cited by examiner

FIG. 4A                                    100

```
SET HDR LEVEL

NUMBER OF              ┌─────────────┐
  STACKED IMAGES         │ 1 IMAGE    ∨│ ──────101
                         └─────────────┘

EDGE EMPHASIS          ┌─────────────┐
                         │ LOW        ∨│ ──────102
                         └─────────────┘

MAPPING RANGE DESIGNATION    ◯          ──────103

┌──────────────────┐
                    │ DETAILED SETTINGS│
                    └──────────────────┘

MOVING BODY TRACKING         ◯          ──────104

┌──────────────────┐
                    │ DETAILED SETTINGS│
                    └──────────────────┘

AMBIENT LIGHT REMOVAL        ◯          ──────105
```

FIG. 4B                                    110

```
MAPPING RANGE SETTING

DISTRIBUTION RANGE    ┌─────────────┐
                        │ MEDIUM     ∨│ ──────111
                        └─────────────┘

BRIGHTNESS            ┌─────────────┐
                        │ 2          ∨│ ──────112
                        └─────────────┘

HALATION PREVENTION   ┌─────────────┐
                        │ HIGH       ∨│ ──────113
                        └─────────────┘
```

Figure 5:
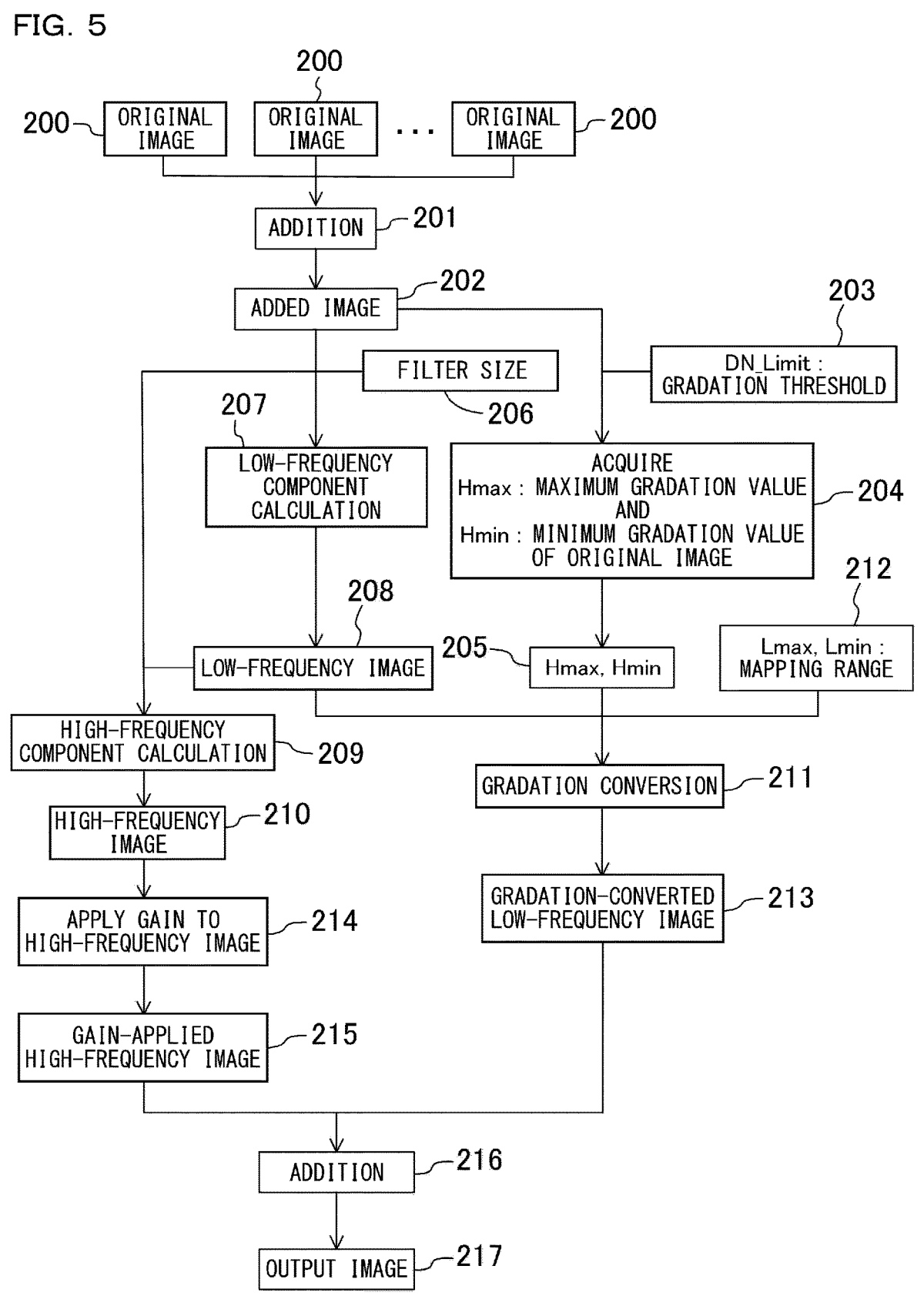

200 — ORIGINAL IMAGE      ORIGINAL IMAGE  ...  ORIGINAL IMAGE — 200

ADDITION — 201

ADDED IMAGE — 202          203

FILTER SIZE — 206          DN_Limit : GRADATION THRESHOLD

207

LOW-FREQUENCY COMPONENT CALCULATION

ACQUIRE
Hmax : MAXIMUM GRADATION VALUE
AND
Hmin : MINIMUM GRADATION VALUE
OF ORIGINAL IMAGE — 204

212

208

LOW-FREQUENCY IMAGE  205 — Hmax, Hmin      Lmax, Lmin : MAPPING RANGE

HIGH-FREQUENCY COMPONENT CALCULATION — 209

HIGH-FREQUENCY IMAGE — 210

GRADATION CONVERSION — 211

APPLY GAIN TO HIGH-FREQUENCY IMAGE — 214

GRADATION-CONVERTED LOW-FREQUENCY IMAGE — 213

GAIN-APPLIED HIGH-FREQUENCY IMAGE — 215

ADDITION — 216

OUTPUT IMAGE — 217

MAPPING RANGE: ENTIRE RANGE
MAPPING RANGE: MEDIUM
MAPPING RANGE: SMALL
MAPPING RANGE: FLAT

HALATION PREVENTION: LARGE

HALATION PREVENTION: MEDIUM

HALATION PREVENTION: SMALL

FIG. 10B
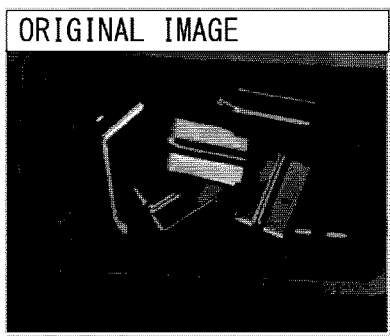
ORIGINAL IMAGE
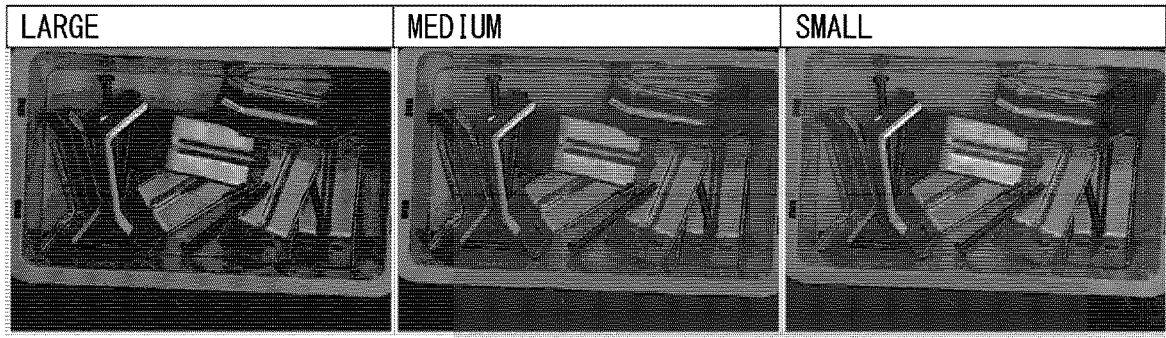
LARGE     MEDIUM     SMALL

IMAGE PROCESSING APPARATUS

CROSS-REFERENCE TO RELATED APPLICATIONS

The present application claims foreign priority based on Japanese Patent Application No. 2023-058153, filed Mar. 31, 2023, the contents of which are incorporated herein by reference.

BACKGROUND OF THE INVENTION

Field of the Invention

The present disclosure relates to an image processing apparatus for processing a workpiece image obtained by imaging a workpiece.

Description of Related Art

In image inspection using the workpiece image obtained by imaging the workpiece, the difference in brightness in the workpiece image tends to be large depending on, for example, the material, size, and the like of the workpiece. Therefore, the dynamic range becomes insufficient, which disables the image inspection. For example, in the case of a workpiece image obtained by imaging a metal workpiece, the reflectance of light is large on the surface of the metal workpiece, and thus a bright portion is likely to appear on the workpiece image.

In addition, in the case of a large workpiece, ununiform illumination tends to occur, and the workpiece image tends to be dark partially.

As a method for expanding the dynamic range of a workpiece image, there has been, for example, a multi-shot HDR that expands the dynamic range by synthesizing a plurality of images captured at different exposure times, and a one-shot HDR as disclosed in JP-A-2015-232478 that determines in advance a tone mapping curve for the workpiece image and executes gradation conversion of the workpiece image according to the determined tone mapping curve.

SUMMARY OF THE INVENTION

However, if the multi-shot HDR is used in in-line inspection of sequentially inspecting workpieces of the same type, one workpiece is imaged a plurality of times, which lowers the tact, and it is difficult to cope with the inspection of moving workpieces.

On the other hand, the one-shot HDR is superior to the multi-shot HDR by being capable of acquiring an image having a wide dynamic range by only one imaging and thus not lowering the tact as in a multi-shot HDR, and being capable of coping with moving workpieces.

However, in the in-line inspection, the workpieces may be conveyed in different postures. The reflection state of light may be changed by the different postures of the workpieces and thus cannot be coped with by the tone mapping determined in advance. In addition, the influence of ambient light cannot be coped with by the tone mapping determined in advance. That is, the use of the one-shot HDR is advantageous in not lowering the tact and being capable of coping with the inspection of moving workpieces, but has a lower robustness.

The present disclosure has been made in view of the above, and an object of the present disclosure is to enable highly robust gradation conversion regardless of the gradation range of an input workpiece image.

In order to achieve the above object, an aspect of the present disclosure can be assumed as an image processing apparatus including: an imaging unit configured to generate workpiece images obtained by imaging a workpiece; and an image generation unit configured to generate an output image having a gradation value in a predetermined gradation range by converting the workpiece images sequentially input from the imaging unit. The image generation unit generates, for each of the input workpiece images, a gradation conversion condition for converting a first gradation value in the input workpiece image into a minimum gradation value in the predetermined gradation range and converting a second gradation value higher than the first gradation value in the workpiece image into a maximum gradation value in the predetermined gradation range, and generates, for each of the input workpiece images, the output image having the gradation value in the predetermined gradation range by performing gradation conversion on each of the gradation values of the workpiece image using the gradation conversion condition corresponding to the workpiece image.

According to this configuration, if the workpiece images generated by the imaging unit are sequentially input to the image generation unit, the gradation conversion condition is generated for each workpiece image. For example, a gradation conversion condition suitable for each workpiece image is generated even if the reflection state of light on the surface is different for each workpiece image, such as in a metal workpiece. Further, a gradation conversion condition suitable for each workpiece image is generated even if the influence of ambient light is different for each workpiece image. In addition, since the workpiece image is subjected to gradation conversion using the gradation conversion condition corresponding to the workpiece image, the gradation of the workpiece image is optimized without imaging a plurality of times.

The image processing apparatus may further include an input unit configured to receive, from a user, designation of a parameter related to an input image or an output image. In this case, the image generation unit may determine the predetermined gradation range in accordance with the parameter received by the input unit. Therefore, it is possible to also reflect the intention of the user on the gradation range of the output image.

The parameter may include: a parameter for changing a width of the predetermined gradation range by changing both the maximum gradation value and the minimum gradation value of the predetermined gradation range; a parameter for changing a position of the predetermined gradation range in the entire gradation range while maintaining the width of the predetermined gradation range; a parameter for changing a threshold that is an upper limit value of the second gradation value; and the like. The first gradation value may be a minimum gradation value of the input workpiece image. The second gradation value may be a maximum gradation value of the input workpiece image.

The image generation unit may: for each of the input workpiece images, extract a low-frequency component of the workpiece image and generate the gradation conversion condition based on the low-frequency component; and perform the gradation conversion on the low-frequency component using the gradation conversion condition based on the low-frequency component, and generate the output image based on the low-frequency component after the gradation conversion. That is, the high-frequency component of the workpiece image is a portion in which the contrast of brightness is finely divided, and includes pixels having a high gradation value. If the gradation conversion condition is generated while including the high-frequency component of the workpiece image, the high-frequency component may be attenuated. In this configuration, the attenuation of the high-frequency component due to the gradation conversion can be prevented by generating the gradation conversion condition based on the low-frequency image of the workpiece image.

The image generation unit may: for each of the input workpiece images, further extract a high-frequency component excluding the low-frequency component, and apply a gain calculated from the gradation conversion condition based on the low-frequency component to the high-frequency component; and generate the output image based on the low-frequency component after the gradation conversion and the high-frequency component applied with the gain. This enables gradation conversion suitable for each of the low-frequency component and the high-frequency component of the workpiece image.

The image processing apparatus may further include an input unit configured to receive, from a user, designation of a parameter when the image generation unit extracts the low-frequency component. In this case, the image generation unit may extract the low-frequency component having a magnitude corresponding to the parameter received by the input unit. Therefore, it is possible to also reflect the intention of the user when extracting the low-frequency component.

The image generation unit may generate the workpiece image by synthesizing a plurality of images obtained by sequentially imaging the same workpiece by the imaging unit. According to this configuration, the gradation conversion condition can be generated with an input image obtained by synthesizing a plurality of images, in which the S/N ratio is improved. Therefore, the gradation conversion condition is more appropriate.

If the input workpiece image is a color image, the image generation unit may generate the output image by converting a saturation of pixels having a gradation value equal to or less than a first threshold among pixels in the workpiece image into a predetermined value or less. For example, if the gradation value of a dark portion having a poor S/N ratio is set high, false colors derived from noise may be conspicuous in the workpiece image. According to this configuration, however, if the gradation value of the input workpiece image is considerably low, the saturation of the pixels having a low gradation value can be lowered to eliminate the hue. Accordingly, the false colors become inconspicuous. For example, the saturation of the pixels having a gradation value equal to or less than the first threshold may be set to, for example, 0.

If the input workpiece image is a color image, the image generation unit may generate the output image by continuously converting a saturation of pixels having a gradation value larger than the first threshold and equal to or less than a second threshold among pixels in the workpiece image, in accordance with the gradation value.

As described above, the gradation conversion condition for converting the first gradation value in the input workpiece image into the minimum gradation value in the predetermined gradation range and converting the second gradation value higher than the first gradation value into the maximum gradation value in the predetermined gradation range is generated for each workpiece image, and the gradation conversion is performed for each workpiece image using the gradation conversion condition corresponding to the workpiece image. Therefore, it is possible to perform highly robust gradation conversion regardless of the gradation range of the input workpiece image.

BRIEF DESCRIPTION OF THE DRAWINGS

FIG. 4A is a condition setting screen, and FIG. 4B is a mapping range setting screen;

FIG. 5 is a diagram illustrating the flow of processing from an input image until an output image is generated;

FIG. 10B is a diagram illustrating the difference between the images obtained under the respective setting conditions of halation prevention;

DETAILED DESCRIPTION

Hereinafter, embodiments of the present invention will be described in detail with reference to the drawings. The following description of the preferred embodiments is only an essential example, and is not intended to limit the present invention, its application, or its use.

Figure 1:
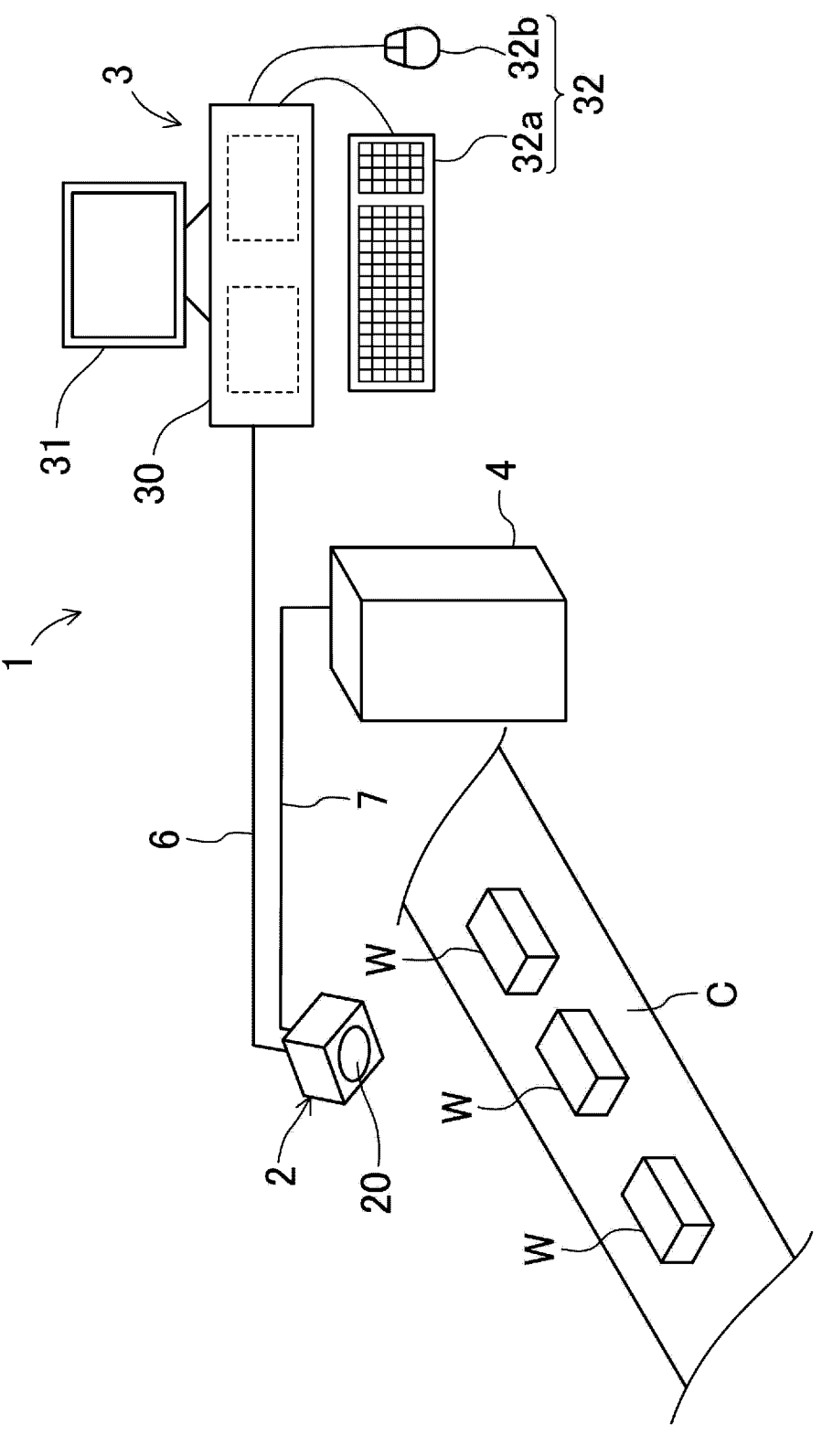
FIG. 1 is a schematic diagram illustrating the configuration of an image processing apparatus according to an embodiment of the present invention.
Figure 2:
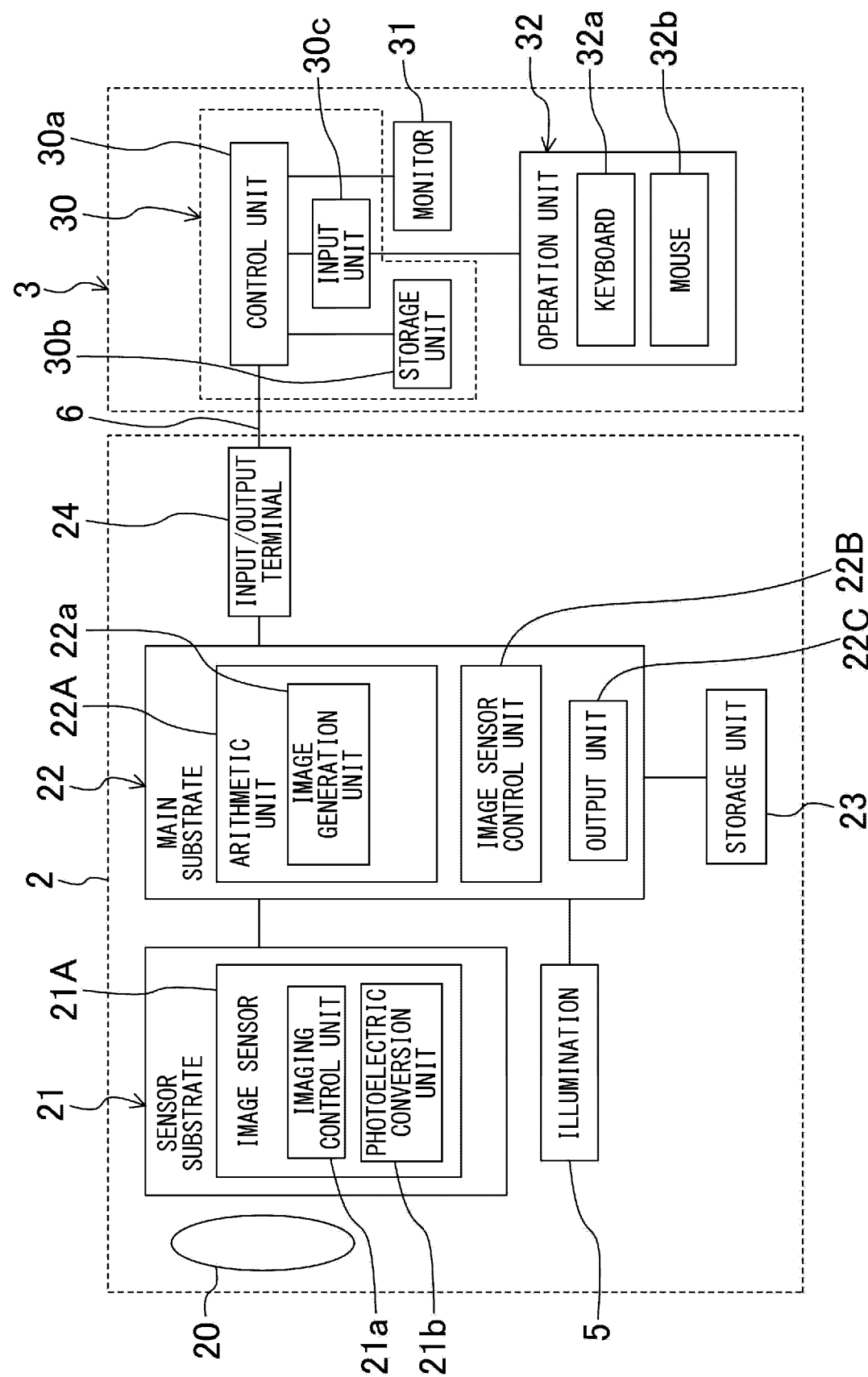
FIG. 2 is a block diagram of the image processing apparatus.

FIG. 1 is a diagram illustrating the configuration of an image processing apparatus 1 according to an embodiment of the present invention. FIG. 2 is a block diagram of the image processing apparatus 1. FIG. 1 illustrates the operation of the image processing apparatus 1. The image processing apparatus 1 includes a camera 2 for imaging of a workpiece W, and an image processing controller 3 for executing the inspection or the like based on a workpiece image generated by the camera 2. The image processing apparatus 1 may further include an external device 4 such as a programmable logic controller (PLC). The external device 4 may or may not be a component of the image processing apparatus 1.

The image processing apparatus 1 is used at a site where a plurality of workpieces W are conveyed sequentially. At such a site, the workpiece W is conveyed at a predetermined speed by a conveying device such as a belt conveyor C. The camera 2 is controlled by, for example, the external device 4 or the image processing controller 3 to image the workpiece W conveyed by the belt conveyor C when the workpiece W enters the visual field range of the camera 2. By repeating this process, the camera 2 sequentially images the plurality of workpieces W conveyed by the belt conveyor C.

The image processing apparatus 1 also includes an illumination 5 (illustrated in FIG. 2) for irradiating the workpiece W with light when the workpiece W is imaged by the camera 2. In the present embodiment, a case where the illumination 5 is provided in the camera 2 will be described, but the illumination 5 may be an external illumination separate from the camera 2.

Although not illustrated, the camera 2 can also image a stopped workpiece W. Further, the camera 2 can be operated in a state of being attached to, for example, a robot arm, and the operation form of the image processing apparatus 1 is not particularly limited.

The workpiece W may have any shape and size. The workpiece W includes, for example, a metal workpiece having a glossy surface.

In addition to the illumination 5, the camera 2 includes an optical system 20 including a plurality of lenses, a sensor substrate 21, a main substrate 22, a storage unit 23, and an input/output terminal 24. The light emitted to the workpiece W by the illumination 5 and reflected by the surface of the workpiece W, the natural light and the environment light reflected by the surface of the workpiece W, and the like are incident on the optical system 20.

The sensor substrate 21 and the main substrate 22 are communicably connected to each other. The sensor substrate 21 is provided with an image sensor 21A. The image sensor 21A has a light-receiving surface constituted by a large number of light-receiving elements, like a CMOS image sensor or a CCD image sensor. The image sensor 21A is provided with an imaging control unit 21a and a photoelectric conversion unit 21b. The imaging control unit 21a is a unit for controlling the exposure time, the gain, and the like of the image sensor 21A. The photoelectric conversion unit 21b is a unit for generating a workpiece image obtained by imaging the workpiece W, by converting the intensity of the light emitted from the optical system 20 and received by the light receiving surface into an amount of charge and converting the intensity of the light into an electric signal. Accordingly, the image sensor 21A is a member corresponding to an example of an imaging unit of the present invention, and sequentially generates and outputs workpiece images at the site where the workpieces W are sequentially conveyed as illustrated in FIG. 1.

The camera 2 outputs the generated workpiece image to the main substrate 22. The main substrate 22 is provided with an arithmetic unit 22A, an image sensor control unit 22B, and an output unit 22C. The arithmetic unit 22A, the image sensor control unit 22B, and the output unit 22C are configured with hardware such as a processor such as a CPU or an ASIC, a RAM, or a ROM. By the hardware executing a predetermined program, the arithmetic unit 22A, the image sensor control unit 22B, and the output unit 22C can execute a process. The program is stored in the ROM, the storage unit 23, or the like.

The arithmetic unit 22A includes an image generation unit 22a for receiving the workpiece image generated by the camera 2. The details will be described later, but the image generation unit 22a is a unit for generating an output image having a gradation value in a predetermined gradation range by converting the workpiece images sequentially input from the camera 2. This example will describe a case where the image generation unit 22a is incorporated in the camera 2, but the image generation unit 22a may be incorporated in the image processing controller 3 or may be incorporated in a device other than the camera 2 and the image processing controller 3.

The image sensor control unit 22B is a unit for outputting a control signal to the imaging control unit 21a of the image sensor 21A. The imaging control unit 21a controls the exposure time and the gain based on the control signal output from the image sensor control unit 22B, such that the exposure time becomes a predetermined time and the gain becomes a predetermined gain. The output unit 22C is a unit for outputting the output image generated by the image generation unit 22a to the storage unit 23, the input/output terminal 24, and the like.

The storage unit 23 is configured with, for example, a storage device using an integrated circuit, and is connected to the main substrate 22 to transmit and receive data to and from the main substrate 22. The data generated on the main substrate 22 side (including the image data and the like) can be stored in the storage unit 23, and the data stored in the storage unit 23 can be read from the main substrate 22 side.

The input/output terminal 24 is connected to the main substrate 22, and can transmit and receive various signals to and from the main substrate 22. The input/output terminal 24 may be configured with, for example, a communication interface, and is a member communicably connected to the image processing controller 3. The input/output terminal 24 of the camera 2 and the image processing controller 3 are connected by a communication line 6. If the external device 4 illustrated in FIG. 1 is installed, the external device 4 and the input/output terminal 24 of the camera 2 are connected by another communication line 7.

The image processing controller 3 includes a body unit 30, a monitor 31, and an operation unit 32. As illustrated in FIG. 2, the body unit 30 includes a control unit 30a, a storage unit 30b, and an input unit 30c. The control unit 30a and the input unit 30c are configured with hardware such as a processor such as a CPU or an ASIC, a RAM, or a ROM. By the hardware executing a predetermined program, the control unit 30a can execute various processes, and the input unit 30c can receive various operations performed by the user.

After acquiring the workpiece image via the input/output terminal 24 of the camera 2, the control unit 30a inspects the workpiece W based on the acquired workpiece image. The inspection includes, for example, the presence or absence of flaws, the determination as to whether the measured dimension is within a tolerance range, the determination as to whether the workpiece W is a non-defective product or a defective product, and the like. The control unit 30a outputs and stores the inspection result in the storage unit 30b. The control unit 30a can also output the inspection result to the monitor 31 and cause the monitor 31 to display the inspection result. The monitor 31 is configured with, for example, a liquid crystal display device or an organic EL display device.

The operation unit 32 includes an operation device for the user to perform various input operations. When the operation unit 32 is operated, the operation content is received by the input unit 30c. The operation unit 32 includes, for example, a keyboard 32a and a mouse 32b. Although not illustrated, a touch panel may be included in the operation unit 32. The touch panel is configured to detect a touch operation by the user. The touch panel and the monitor 31 may be integrated. In this case, for example, the user interface displayed on the monitor 31 can be directly operated on the touch panel.

Details of Image Generation Unit

Next, the image generation unit 22a provided in the camera 2 will be described in detail. The image generation unit 22a is a unit for generating, for each of the input workpiece images, a gradation conversion condition for performing gradation conversion on the input workpiece image, and generating, for each of the input workpiece images, an output image having a gradation value in a predetermined gradation range by performing gradation conversion on each of the gradation values of the workpiece image using the gradation conversion condition corresponding to the workpiece image. The gradation conversion condition is a conversion condition for converting a first gradation value in the input workpiece image into a minimum gradation value in a predetermined gradation range and converting a second gradation value higher than the first gradation value in the same workpiece image into a maximum gradation value in the predetermined gradation range. The gradation conversion is also referred to as tone mapping.

Hereinafter, an example of the processing procedure of the gradation conversion will be described based on the flowchart illustrated in FIG. 3. By executing the processing illustrated in this flowchart, it is possible to achieve highly robust gradation conversion regardless of the gradation range of the input workpiece image.

In step SA1 after the start, the input unit 30c receives the input of the imaging conditions and the parameters. Thereby, the mapping range, that is, the width of the gradation distribution of the output image can be dynamically determined based on the gradation value of the input image.

Specifically, the input unit 30c generates a condition setting screen 100 illustrated in FIG. 4A and causes the monitor 31 to display the condition setting screen 100. The condition setting screen 100 is provided with a number-of-stacked-images number input area 101 for setting the number of times of imaging, an edge emphasis setting area 102 for setting the degree of the effect of edge emphasis, a mapping range designation area 103 for designating the mapping range, a moving body tracking setting area 104 for setting a moving body tracking function, and an ambient light removal setting area 105 for setting ambient light removal.

The number-of-stacked-images input area 101 allows the input of the number of times to image the same workpiece W by the camera 2. When the user operates the operation unit 32 to input a desired number in the number-of-stacked-images input area 101, the input number is received by the input unit 30c as the number of times of imaging by the camera 2. The number of times of imaging received by the input unit 30c is stored in the storage unit 30b or the like. The number of times of imaging may be input by the user as desired, or may be set between 1 and 8, for example. The number of times of imaging may be selectable with a pull down menu or the like.

The edge emphasis setting area 102 allows the setting of the emphasis degree of the high-frequency component of the workpiece image. When the user operates the operation unit 32 to select the emphasis degree of the high-frequency component of the workpiece image from "small", "medium", "large", and the like, the input unit 30c receives the selected emphasis degree as the emphasis degree of the high-frequency component of the workpiece image. The emphasis degree of the high-frequency component received by the input unit 30c is stored in the storage unit 30b or the like. The emphasis degree of the high-frequency component is not limited to three stages, and may be two stages or four or more stages.

When the mapping range designation area 103 is operated by the operation unit 32, the input unit 30c generates a mapping range setting screen 110 illustrated in FIG. 4B and causes the monitor 31 to display the mapping range setting screen 110. The mapping range setting screen 110 includes a distribution range setting area 111, a brightness setting area 112, and a halation prevention setting area 113.

The distribution range setting area 111 allows the setting of the size of the mapping range. A narrower mapping range emphasizes the low-gradation pixels. In the distribution range setting area 111, a range selected by the user by operating the operation unit 32 from options such as "entire range", "medium", "small", and "flat" is input as the mapping range. The input mapping range is received by the input unit 30c. The mapping range received by the input unit 30c is stored in the storage unit 30b or the like. The parameters for determining the mapping range are parameters for changing the width of the predetermined gradation range by changing both the maximum gradation value and the minimum gradation value of the predetermined gradation range. The setting of the mapping range is not limited to the three-stage setting.

The brightness setting area 112 allows the setting of the brightness level of the output image. The brightness of the output image is set to a brightness corresponding to a number selected by the user by operating the operation unit 32 from options such as "1", "2", and "3". "3" indicates the brightest and "1" indicates the darkest. The options are an example, and may be an option using other expressions, or an area allowing the user to set any brightness may be provided. When the brightness level is changed, the mapping range set in the distribution range setting area 111 is translated without changing the width of the mapping range. That is, the brightness level is a parameter for changing the position of the predetermined gradation range in the entire gradation range while maintaining the width of the predetermined gradation range. The entire gradation range has a gradation value of 0 to 255, for example.

In the halation prevention setting area 113, for example, the user can operate the operation unit 32 to select an option such as "large", "medium", or "small" to set a desired halation prevention effect. "Large" indicates that the halation prevention effect is large, and "small" indicates that the halation prevention effect is small. The halation of the workpiece image is prevented in correspondence with the halation prevention effect set by the user. The halation refers to a whiteout in the output image. For example, the halation prevention effect is set to "small" if it is desired to increase the pixel value of the low-gradation portion even if halation is allowed. On the other hand, the halation prevention effect is set to "large", if it is desired to prevent the whiteout of the output image. That is, the maximum gradation value referred to by the gradation value of the input image is set in the setting of halation prevention. The setting of halation prevention is received by the input unit 30c and stored in the storage unit 30b or the like. The gradation threshold is determined by the setting of halation prevention. The gradation threshold is a parameter for changing a threshold that is the upper limit value of the second gradation value.

In the moving body tracking setting area 104 illustrated in FIG. 4A, the user can make a setting for causing the inspection area to track the movement of the workpiece W. In the ambient light removal setting area 105, the user can make a setting for eliminating or reducing the influence of ambient light generated on the workpiece image. The setting in the moving body tracking setting area 104 and the setting in the ambient light removal setting area 105 are received by the input unit 30c and stored in the storage unit 30b or the like.

In step SA1, a filter size for the edge emphasis can be set as one of the parameters. Therefore, a filter size set by the user operating the operation unit 32 is received by the input unit 30c and stored in the storage unit 30b or the like. The setting of the filter size can also be referred to as the setting of the blurring degree of the input image. The blurring degree of the input image can be changed by changing the filter size. As described above, the input unit 30c can receive, from the user, the designation of the parameters related to the input image or the output image. The filter size is a parameter for extracting the low-frequency component from the workpiece image by the image generation unit 22a described later, and the input unit 30c also receives, from the user, the designation of the parameter for extracting this low-frequency component.

In step SA2, the imaging conditions and parameters input in step SA1 are transmitted to the camera 2 via the communication line 6. The setting of the imaging conditions and parameters of the camera 2 is changed so as to be the transmitted imaging conditions and parameters and is stored in the storage unit 23 of the camera 2. Thereafter, the arithmetic unit 22A, the image sensor control unit 22B, and the output unit 22C execute the processes according to the changed imaging conditions and parameters.

In step SA3, the camera 2 receives the input of a trigger for starting imaging by the camera 2. The trigger is transmitted from the external device 4 or the image processing controller 3 and received by the arithmetic unit 22A via the input/output terminal 24. When the arithmetic unit 22A receives the trigger, the image sensor 21A is controlled via the image sensor control unit 22B to image the workpiece W. Thus, a workpiece image is generated. The generated workpiece image is stored in the storage unit 23.

In step SA4, it is determined whether the imaging is completed for the number of times of imaging set in step SA1. If it is determined as NO in step SA4 and the imaging is not completed for the number of times of imaging set in step SA1, a new workpiece image is generated through step SA3, and then the process proceeds to step SA4. If it is determined as YES in step SA4 and the imaging is completed for the number of times of imaging set in step SA1, the process proceeds to step SA5. If steps SA3 and SA4 are to be executed a plurality of times, the exposure time is not changed. Thus, a plurality of workpiece images having the same exposure time are generated.

In step SA5, if a plurality of workpiece images are generated through steps SA3 and SA4, the image generation unit 22a synthesizes the plurality of workpiece images into one workpiece image. As illustrated in FIG. 5, if a plurality of workpiece images are generated through steps SA3 and SA4, a plurality of original images 200 are acquired, and a workpiece image is generated as an added image 202 by simply performing addition 201 on the original images 200. That is, the image generation unit 22a is a unit for generating one workpiece image by synthesizing a plurality of images obtained by sequentially imaging the same workpiece W by the image sensor 21A. By synthesizing a plurality of images, a workpiece image having a good S/N ratio can be obtained. If the number of times of imaging is 1, the process proceeds to step SA6 without executing the synthesis.

Figure 3:
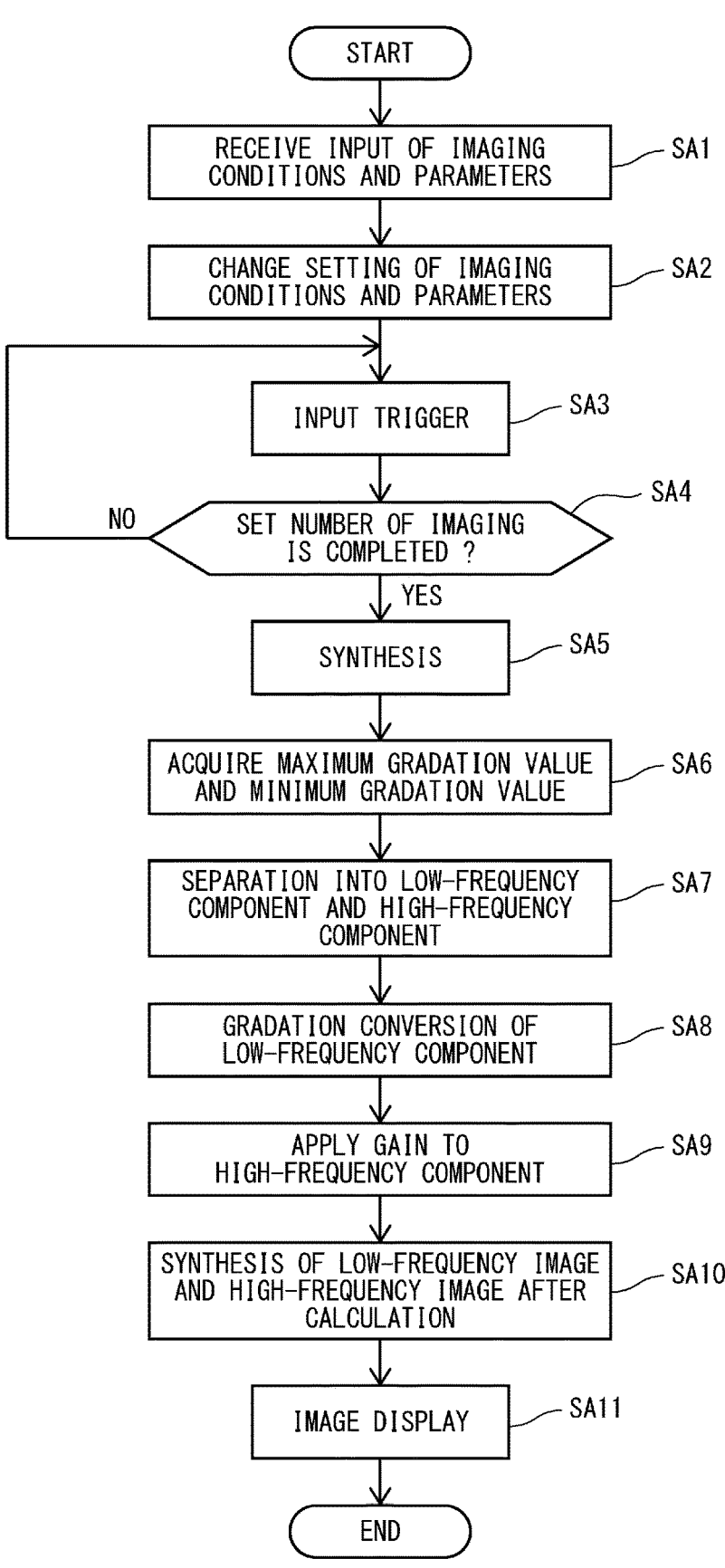
FIG. 3 is a flowchart illustrating an example of a processing procedure of gradation conversion.

In step SA6 illustrated in FIG. 3, the image generation unit 22a determines a predetermined gradation range in accordance with the parameters received by the input unit 30c. When determining the predetermined gradation range, the image generation unit 22a acquires the maximum gradation value and the minimum gradation value of the workpiece image in a gradation range smaller than the gradation threshold in the workpiece image generated in step SA5 (the workpiece image generated in step SA3 if the number of times of imaging is 1). As described above, the gradation threshold is determined when setting the halation prevention. As illustrated in FIG. 5, the image generation unit 22a acquires the gradation threshold as the gradation threshold (DN_Limit) 203. Then, the maximum gradation value and the minimum gradation value 204 are acquired and stored as Hmax and Hmin 205, respectively. At this time, the minimum gradation value of the input workpiece image can be set as the first gradation value, and the maximum gradation value of the input workpiece image can be set as the second gradation value.

In step SA7 illustrated in FIG. 3, the image generation unit 22a separates the low-frequency component and the high-frequency component of the workpiece image. Specifically, the image generation unit 22a applies an averaging filter to the workpiece image to blur the workpiece image. At this time, as illustrated in FIG. 5, the filter size 206 set as described above is read by the image generation unit 22a. The intensity of the averaging filter is set and applied to the workpiece image so as to obtain a blurring degree corresponding to the read filter size. The image generation unit 22a extracts the low-frequency component of the workpiece image to generate a low-frequency image 208 by executing low-frequency component calculation 207. That is, since the designation of the filter size is received by the input unit 30c as a parameter for extracting the low-frequency component of the workpiece image, the image generation unit 22a can extract a low-frequency component having a size corresponding to the filter size.

The image generation unit 22a generates a high-frequency image 210 that is a high-frequency component of the workpiece image by executing high-frequency component calculation 209. In the high-frequency component calculation 209, calculation of subtracting the low-frequency image 208 from the added image 202 is performed. In this manner, the image generation unit 22a can further extract the high-frequency component excluding the low-frequency component for each input workpiece image.

Figure 6:
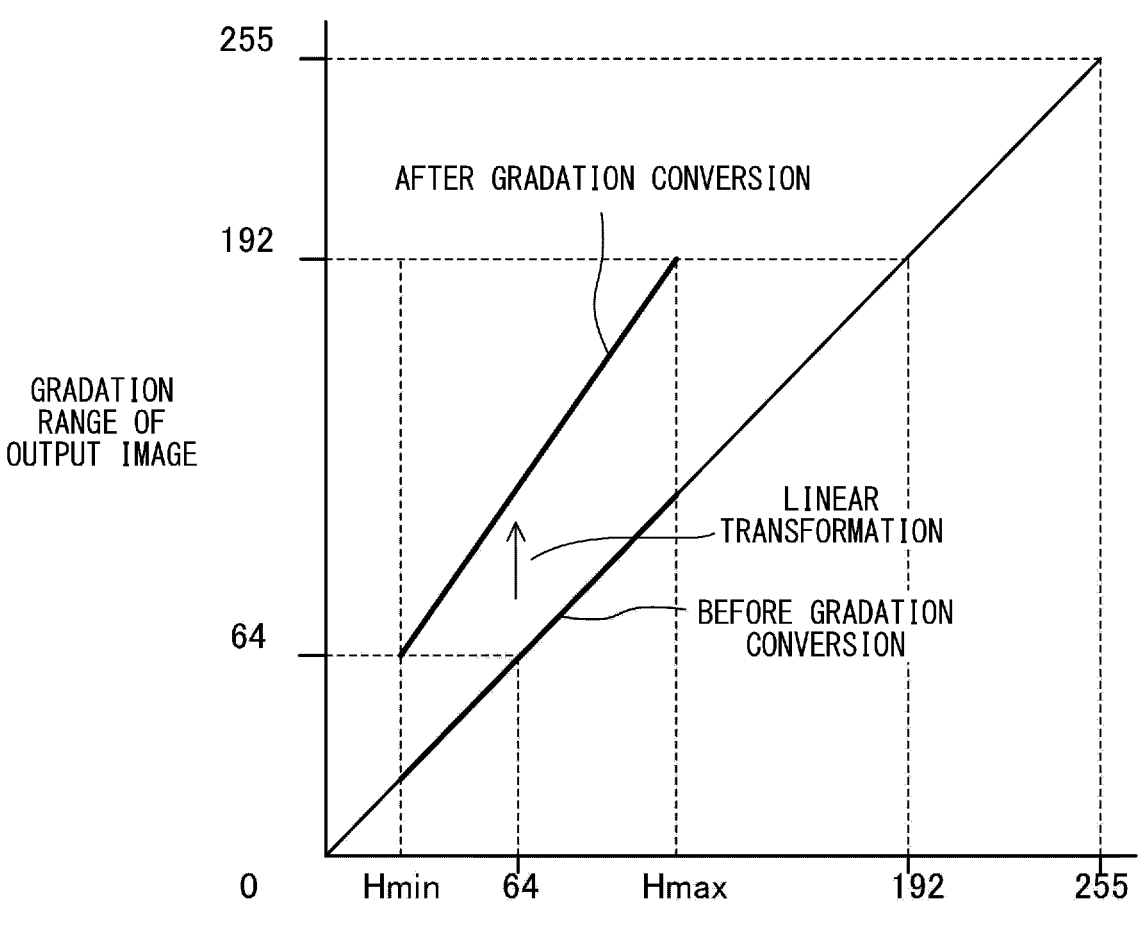
FIG. 6 is a diagram illustrating the concept of gradation conversion.

In step SA8 in FIG. 3, the image generation unit 22a executes gradation conversion on the low-frequency component extracted in step SA7. As illustrated in FIG. 5, when the image generation unit 22a executes a gradation conversion 211, the image generation unit 22a acquires a mapping range (Lmax, Lmin) 212. The gradation conversion 211 can be described based on the conceptual diagram illustrated in FIG. 6, for example. In the graph illustrated in FIG. 6, the horizontal axis represents the gradation range of the input image, and the vertical axis represents the gradation range of the output image. If the minimum gradation value (Hmin) on the horizontal axis is the minimum gradation value in the input image and the maximum gradation value (Hmax) is the maximum gradation value in the input image, an image after gradation conversion is generated for the image before gradation conversion. This corresponds to a gradation-converted low-frequency image 213 in FIG. 5. In the gradation conversion, the image generation unit 22a applies a gain to each pixel in accordance with the gradation value before gradation conversion.

In this manner, for each input workpiece image, the image generation unit 22a extracts a low-frequency component of the workpiece image and generates a gradation conversion condition based on the low-frequency component. The image generation unit 22a can perform gradation conversion on the low-frequency component using the gradation conversion condition based on the extracted low-frequency component, and generate an output image based on the low-frequency component after the gradation conversion.

In step SA8 illustrated in FIG. 3, the image generation unit 22a applies a gain to the high-frequency component obtained in step SA7. Specifically, the image generation unit 22a applies the gain calculated from the gradation conversion condition based on the low-frequency component to the high-frequency component (the high-frequency image 210 illustrated in FIG. 5) (indicated by reference sign 214 in FIG. 5). Thus, a gain-applied high-frequency image 215 is generated.

Figure 7:
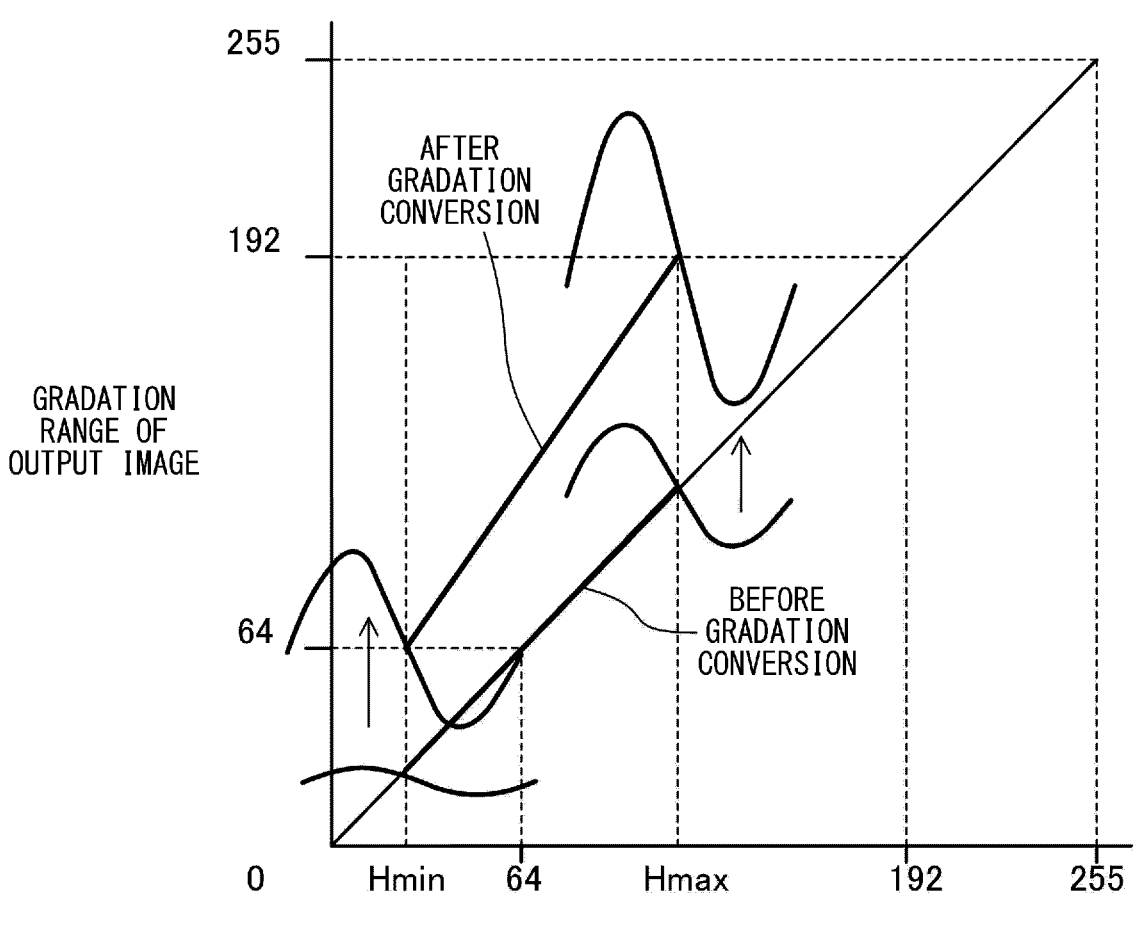
FIG. 7 is a diagram corresponding to FIG. 6 illustrating a case where a gain is applied to a high-frequency component and a low-frequency component in a workpiece image.

FIG. 7 conceptually illustrates the case of emphasizing the high-frequency component, and the gain applied to the low-frequency component can be applied to the high-frequency component. This can, for example, emphasize a weak portion of the light emitted from the illumination 5, or emphasize an edge (high-frequency component) of a dark portion of the workpiece W having a high contrast. Examples of the workpiece W having a high contrast include a workpiece obtained by combining a metal material and a resin material.

Here, the high-frequency component in the workpiece image is generally a portion where the contrast of black and white is high, and thus is a portion where the gradation value is higher. Therefore, when determining the gain to be applied to the high-frequency image 210, the high-frequency component may be attenuated if the determination is based on the added image 202. In this example, the gain to be applied to the high-frequency image 210 is determined based on the low-frequency component in the workpiece image. Therefore, the attenuation of the high-frequency component in the workpiece image can be prevented, and the high-frequency component can be maintained.

Figure 8A:
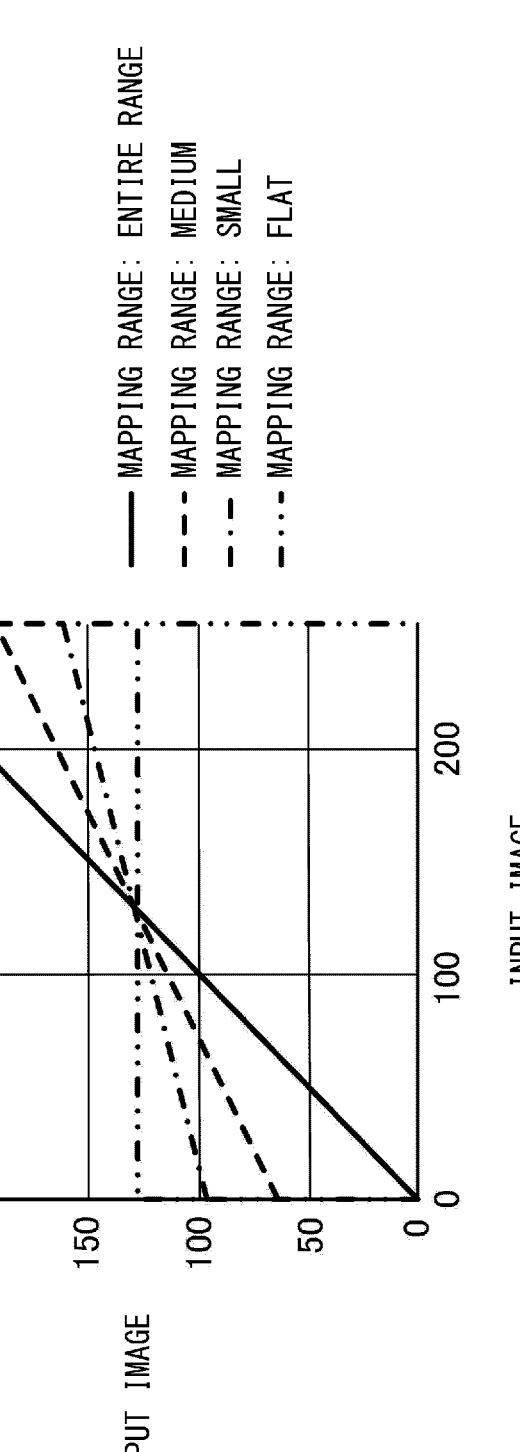
FIG. 8A is a graph illustrating the difference in slope of linear transformation depending on the mapping range.
Figure 8B:
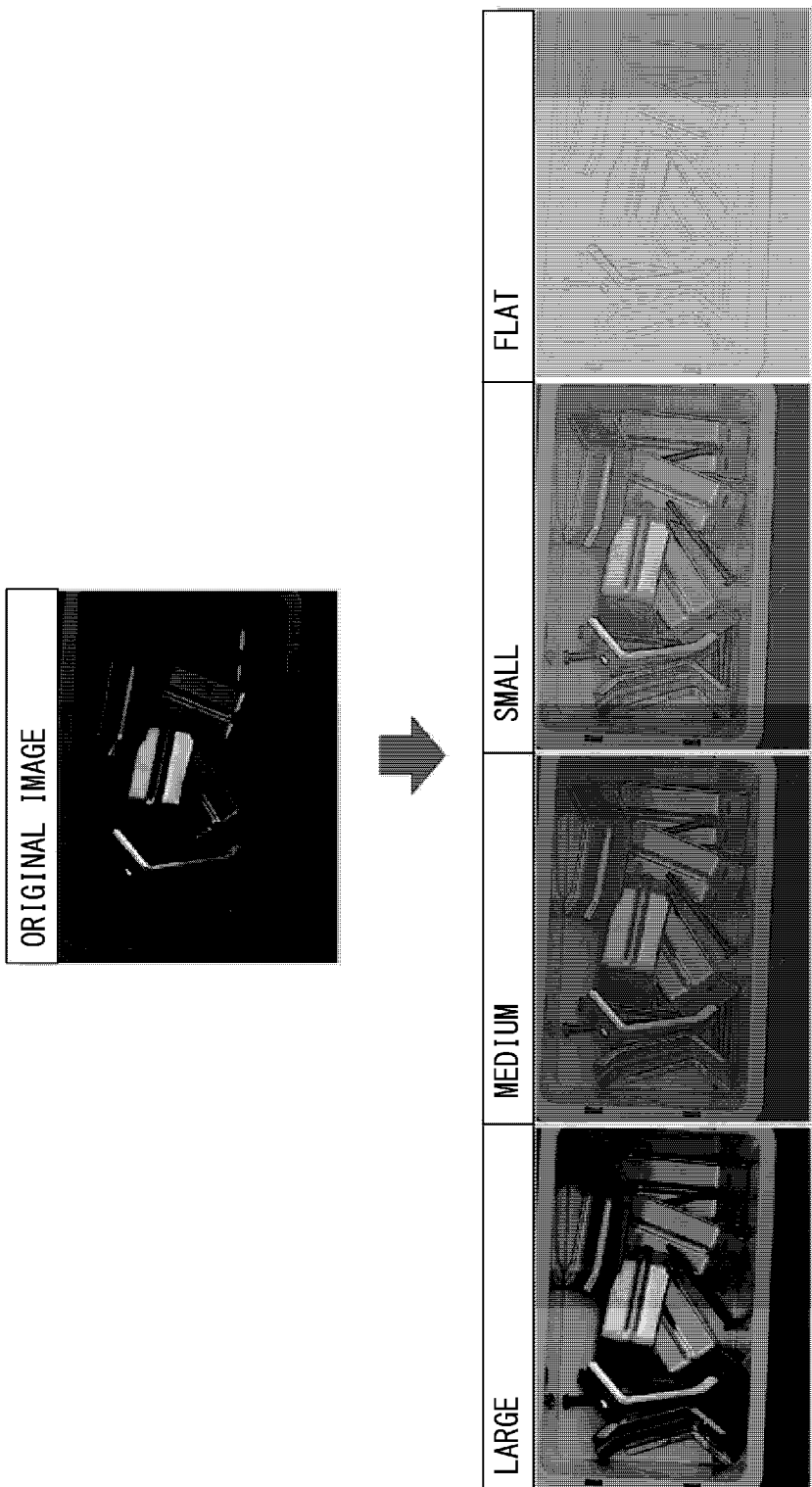
FIG. 8B is a diagram illustrating the difference between the images obtained in the respective setting contents of the mapping range.

FIG. 8A is a graph illustrating the difference in slope of linear transformation depending on the mapping range. FIG. 8B is a diagram illustrating the difference between the images obtained in the respective setting contents of the mapping range. The slope of the linear transformation is a conversion characteristic applied during the gradation conversion in step SA8. In the graph illustrated in FIG. 8A, the horizontal axis represents the gradation value of the input image and the vertical axis represents the gradation value of the output image. If the mapping range is set to "entire range", the slope is the steepest. If the mapping range is "entire range", gamma correction may be performed. If gamma correction is performed, the graph is curved upward.

If the mapping range is set to "flat", the slope is 0. The image obtained by "flat" is an image emphasizing only the edge. If the mapping range is set to "medium", the slope is steeper than when the mapping range is set to "small".

Figure 9A:
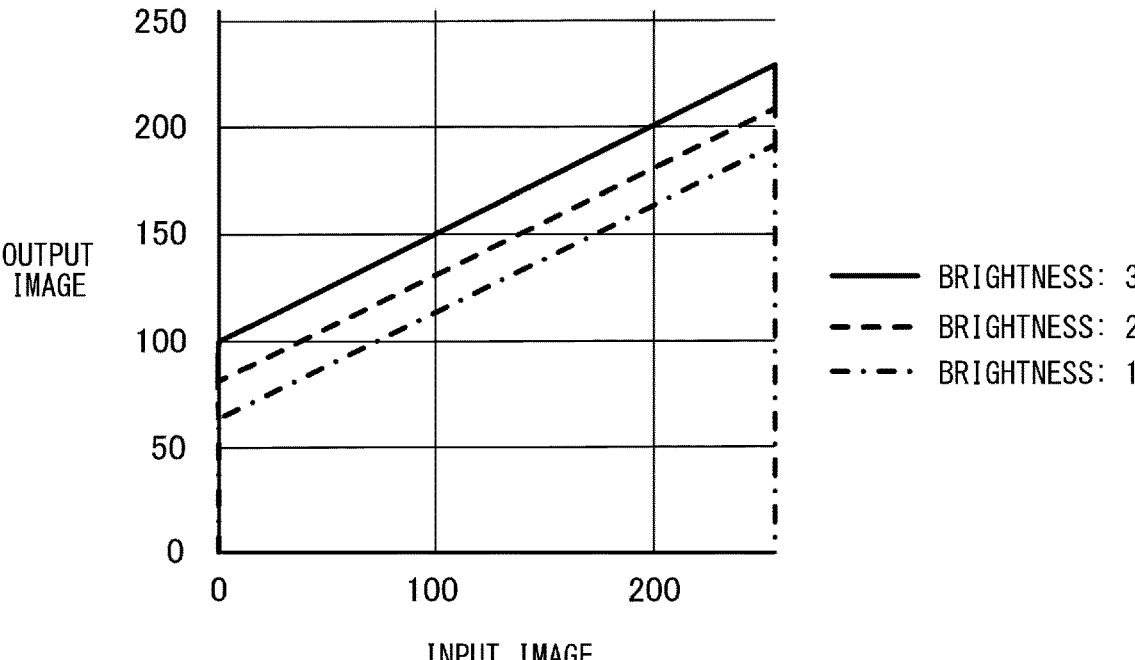
FIG. 9A is a graph illustrating the difference in linear transformation depending on the setting of brightness.
Figure 9B:
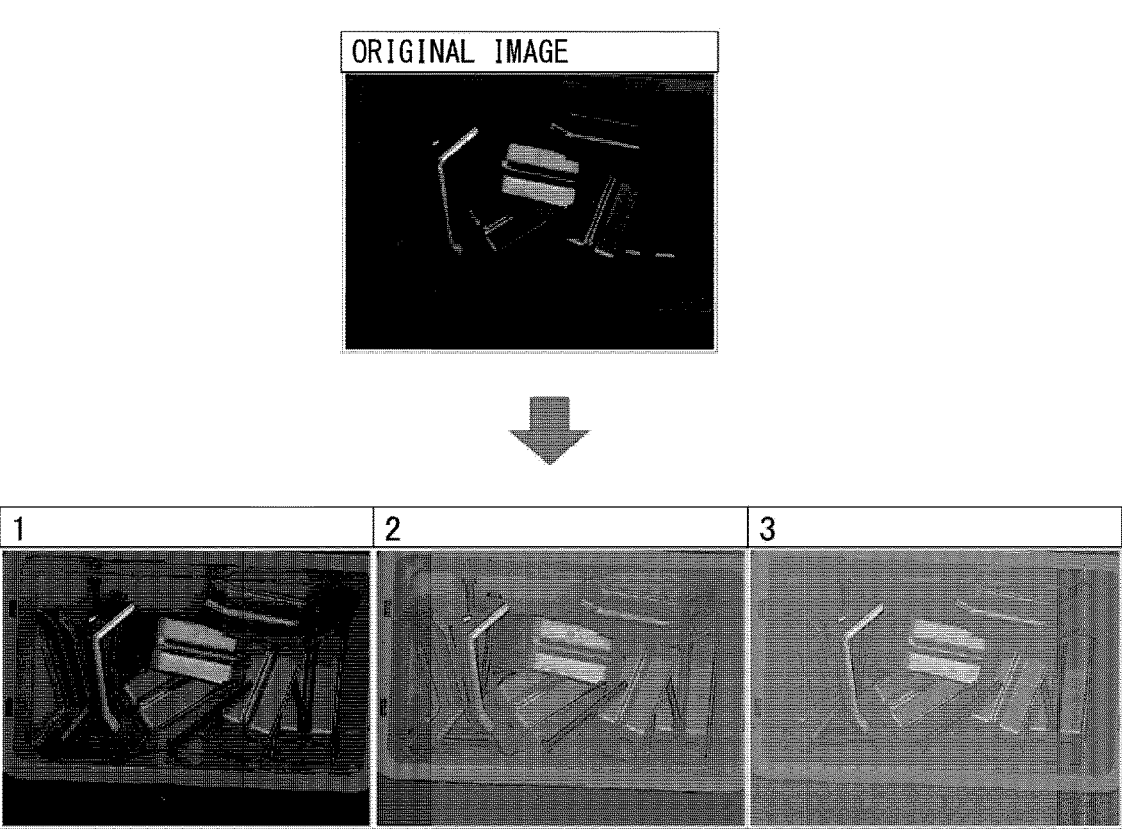
FIG. 9B is a diagram illustrating the difference between the images obtained under the respective setting conditions of brightness.

FIG. 9A is a graph illustrating the difference in linear transformation depending on the setting of brightness. FIG. 9B is a diagram illustrating the difference between the images obtained under the respective setting contents of brightness. In FIG. 9A, the horizontal axis represents the gradation value of the input image, and the vertical axis represents the gradation value of the output image. As illustrated in this graph, if the brightest "3" is selected, the entire mapping range is set in a direction in which the gradation value is higher than that in the case where "2" or "1" is selected. On the other hand, if the darkest "1" is selected, the entire mapping range is set in a direction in which the gradation value is lower than that in the case where "3" or "2" is selected.

Figure 10A:
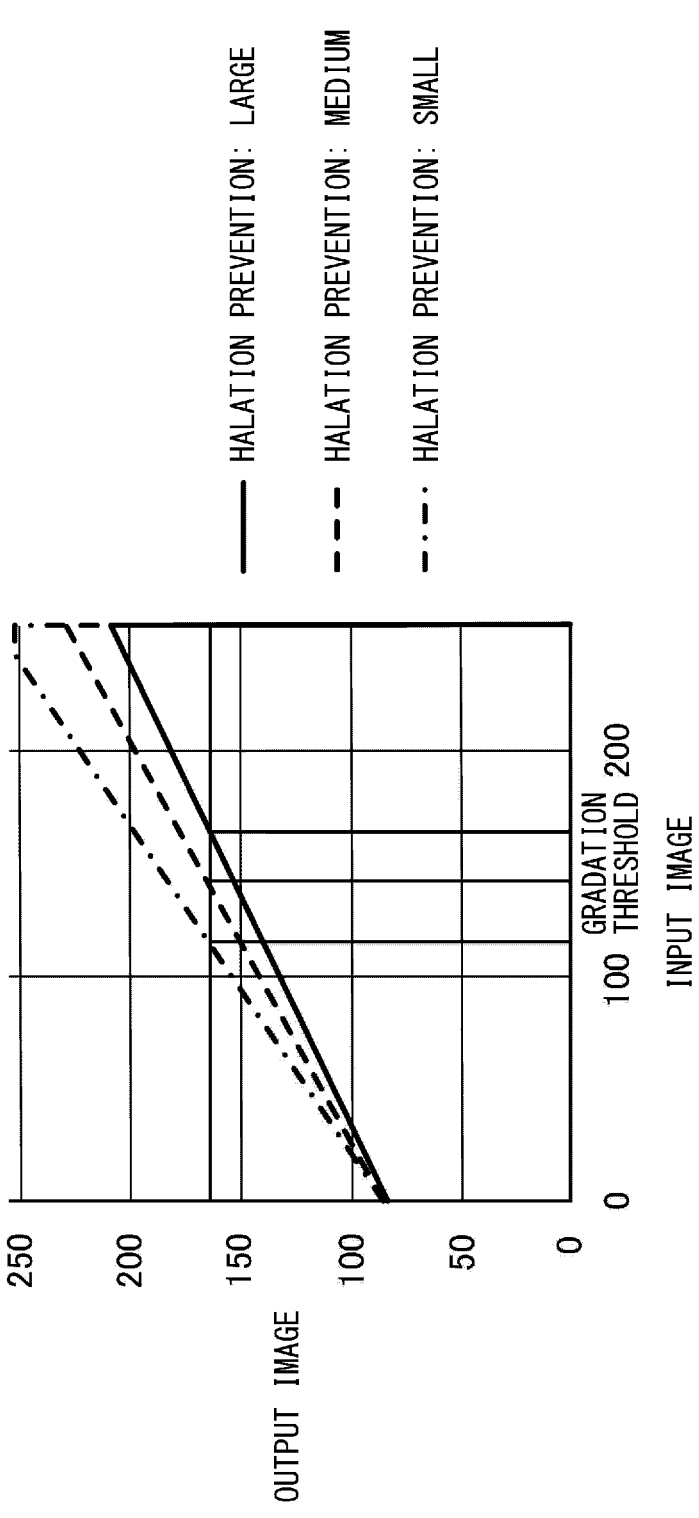
FIG. 10A is a graph illustrating the difference in linear transformation depending on the setting of halation prevention.

FIG. 10A is a graph illustrating the difference in linear transformation depending on the setting of halation prevention. FIG. 10B is a graph illustrating the difference between the images obtained under the respective setting contents of halation prevention. In FIG. 10A, the horizontal axis represents the gradation value of the input image, and the vertical axis represents the gradation value of the output image. As illustrated in this graph, the slope becomes steeper as the halation prevention effect is reduced, and the slope becomes gentler as the halation prevention effect is increased. The y-intercept is fixed to a predetermined value regardless of the halation prevention effect. Different gradation thresholds are set respectively for "large", "medium", and "small" of the halation prevention effect.

In step SA10 in FIG. 3, the image generation unit 22a synthesizes the low-frequency component image (low-frequency image) after the gradation conversion in step SA8 and the high-frequency component image (high-frequency image) after the gain application in step SA9. As illustrated in FIG. 5, the image generation unit 22a executes addition 216 of adding the gradation-converted low-frequency image 213 and the gain-applied high-frequency image 215. Thus, an output image 217 is generated. In step SA11 of FIG. 3, the output unit 22C acquires the output image generated through step SA10, outputs the output image to the image processing controller 3 through the input/output terminal 24, and causes the monitor 31 to display the output image. The control unit 30a of the image processing controller 3 executes the inspection based on the output image. The inspection result can also be displayed on the monitor 31.

False Color Prevention

If the workpiece image is a color image, for example, the gradation value of a dark portion having a poor S/N ratio may set high if the gradation conversion is executed. If the gradation value of a dark portion having a poor S/N ratio is set high, when acquiring a workpiece image, false colors derived from noise may be conspicuous in the workpiece image. The present embodiment is provided with a function of preventing false colors due to such a reason.

The function of preventing false colors can be executed by the image generation unit 22a. If the input workpiece image is a color image, the image generation unit 22a may generate the output image by converting the saturation of pixels having a gradation value equal to or less than a first threshold among pixels in the workpiece image into a predetermined value or less. If the input workpiece image is a color image, the image generation unit 22a may generate the output image by continuously converting the saturation of pixels having a gradation value larger than the first threshold and equal to or less than a second threshold in the workpiece image, in accordance with the gradation value. That is, if the gradation value of the input workpiece image is considerably low, the saturation of the pixels having a low gradation value can be lowered to eliminate the hue. Accordingly, the false colors become inconspicuous. The saturation of the pixels having a gradation value equal to or less than the first threshold may be set to, for example, 0.

Figure 11:
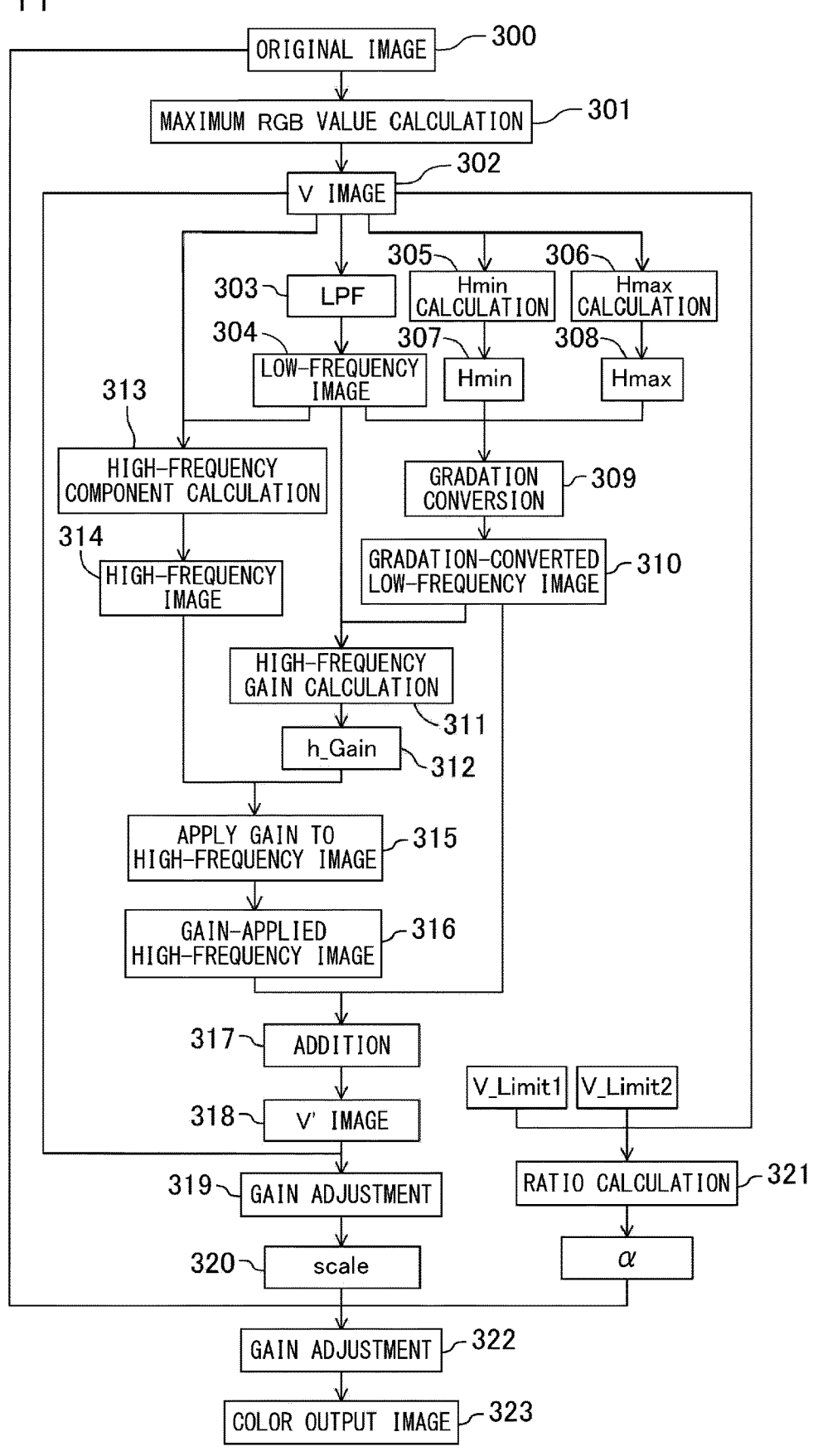
FIG. 11 is a diagram corresponding to FIG. 5 when the input image is a color image.

This will be specifically described below with reference to FIG. 11. An original image 300 is a color image, and may be either an image obtained by synthesizing a plurality of workpiece images or an image constituted by one workpiece image. The image generation unit 22a executes maximum RGB value calculation 301 of the input original image 300.

At this time, HSV conversion is executed to generate a V image 302. The image generation unit 22a executes averaging filter 303 of the filter size designated by the user on the Vimage 302. Thus, a low-frequency image 304 is generated.

The image generation unit 22a executes Hmin (minimum gradation value) calculation 305 and Hmax (maximum gradation value) calculation 306, and generates Hmin 307 and Hmax 308, respectively. The image generation unit 22a acquires the low-frequency image 304, Hmin 307, and Hmax 308 extracted from the V image 302, and generates a gradation-converted low-frequency image 310 by executing gradation conversion 309. In high-frequency gain calculation 311, a gain is calculated based on the low-frequency image to acquire h_Gain 312.

The image generation unit 22a generates a high-frequency image 314 of the workpiece image by executing high-frequency component calculation 313 based on the V image 302 and the low-frequency image 304. The image generation unit 22a applies h_Gain 312 to the high-frequency image 314 (indicated by reference sign 315 in FIG. 11). Thus, a gain-applied high-frequency image 316 is generated. The image generation unit 22a generates a V' image 318 by executing addition 317 of adding the gradation-converted low-frequency image 310 and the gain-applied high-frequency image 316. In gain calculation 319, V'/V is calculated using the same method as in the high-frequency gain calculation 311. Thus, a calculated value (scale) 320 is acquired.

On the other hand, the image generation unit 22a executes ratio calculation 321 by applying V_Lim1 and V_Lim2 to the V image 302, and acquires α. The following calculation formula is used for the ratio calculation. V_Lim1 and V_Lim2 are predetermined thresholds.

$$0 \leq \alpha \leq 1$$

$$\alpha = (\text{V\_Lim2} - V)/(\text{V\_Lim2} - \text{V\_Lim1})$$

Figure 12:
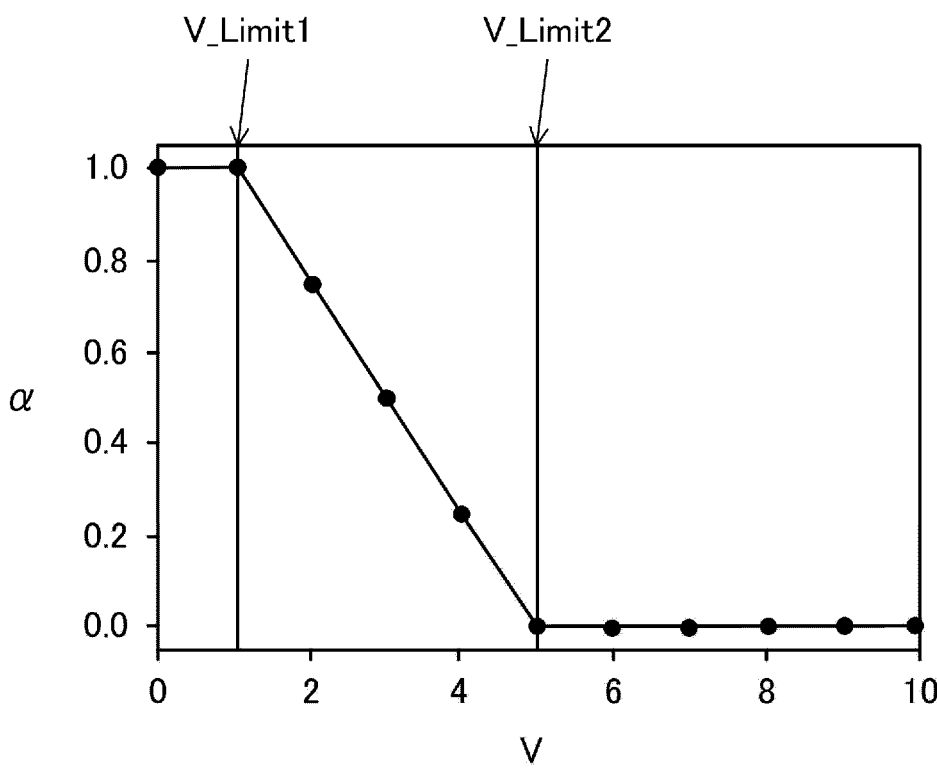
FIG. 12 is a graph illustrating the correlation between a and V.

FIG. 12 illustrates the correlation between a and V. V on the horizontal axis is the gradation value. α is 0 if the gradation value of the V image before the gradation conversion is equal to or greater than the threshold (V_Lim2), and is greater than 0 if the gradation value is equal to or less than the threshold (V_Lim2). If α=0, X'=X×scale, and the values after conversion of R, G, and B depend on the respective original gradation values. If α=1, X'=V', and the values of R, G, and B after conversion do not depend on the value (X) before conversion. This is referred to as grayscaling.

By setting V_Lim1 and V_Lim2 as predetermined thresholds, it is possible to continuously transition between the mode of α=0 and the mode of α=1, and to continuously convert the saturation of the pixels in accordance with the gradation value.

After acquiring α as described above, the image generation unit 22a executes gain adjustment 322 using the original image 300, scale, and α. In this way, the color output image 323 is generated while preventing false colors.

Specific Example in Operation

Figure 13:
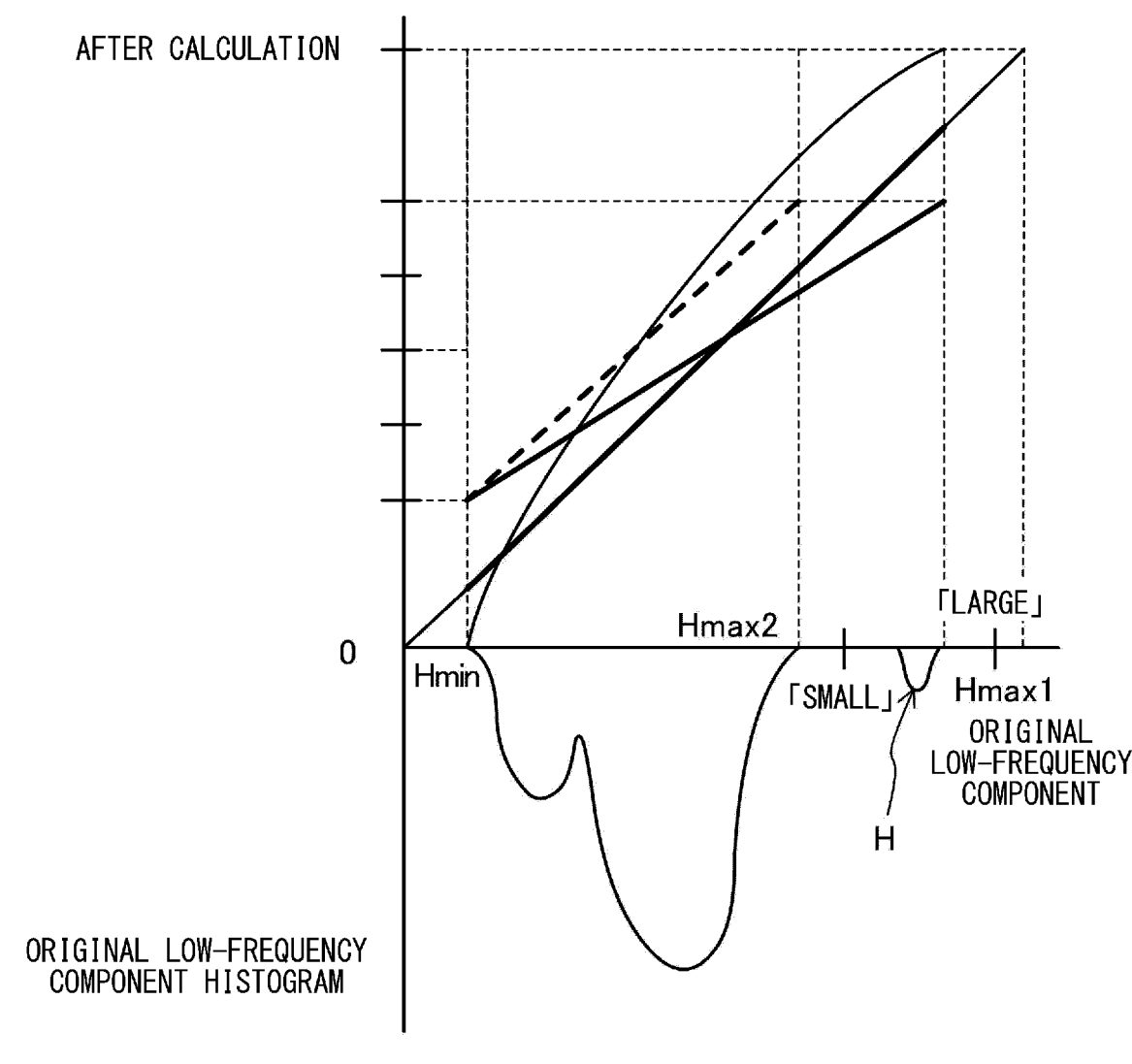
FIG. 13 is a graph illustrating a specific example in operation.

FIG. 13 is a graph illustrating a specific example in operation, in which the horizontal axis and the vertical axis represent gradation values. The lower side displays a histogram of the low-frequency component, and the vertical axis on the lower side represents the number of pixels.

The graph indicated by the solid line is the gradation conversion when the halation prevention is set to "large", and the gradation threshold is a large value. The maximum gradation value of the input image is indicated by "Hmax1".

The graph indicated by the broken line is the gradation conversion when the halation prevention is set to "small", and the gradation threshold is a small value. The maximum gradation value of the input image is indicated by "Hmax2".

In the histogram, the portion indicated by reference sign H is a convex portion caused by halation. In the present embodiment, Hmax2 is set as the maximum gradation value while ignoring the portion indicated by the symbol H, so that the dark portion can be raised while preventing halation of the input image.

Effects of Embodiment

As described above, when the images generated by imaging the workpiece W being conveyed in operation of the image processing apparatus 1 are sequentially input to the image generation unit 22a, the gradation conversion condition is generated for each workpiece image. A gradation conversion condition suitable for each workpiece image can be generated even if, for example, the reflection state of light on the surface is different for each workpiece image, such as in a metal workpiece. In addition, a gradation conversion condition suitable for each workpiece image can be generated even if the influence of ambient light is different for each workpiece image. In addition, since the workpiece image is subjected to gradation conversion using the gradation conversion condition corresponding to the workpiece image, the gradation of the workpiece image is optimized without imaging a plurality of times.

Since the edge (contour information) can be emphasized while the dark portion of the workpiece image is raised by the gradation conversion, it is possible to improve the capability of search when executing the inspection.

Since the illumination is not uniform in operation, a part in the visual field may be dark, and it may be not possible to inspect the workpiece image. By executing the gradation conversion of the present embodiment, however, it is possible to raise the dark part of the workpiece image, thereby generating an image apparently irradiated with uniform illumination. As a result, the capability of inspection is improved.

The above-described embodiment is merely an example in every respect, and should not be construed as being limited. Furthermore, modifications and changes falling in the equivalent scope of the claims are all within the scope of the present invention.

INDUSTRIAL APPLICABILITY

As described above, the image processing apparatus according to the present disclosure can be used when processing a workpiece image obtained by imaging a workpiece.

What is claimed is:

1. An image processing apparatus comprising:

an imaging unit configured to generate workpiece images obtained by imaging a workpiece; and an image generation unit configured to generate an output image having a gradation value in a predetermined gradation range by converting the workpiece images sequentially input from the imaging unit, wherein the image generation unit generates, for each of the input workpiece images, a gradation conversion condition for converting a first gradation value in the input workpiece image into a minimum gradation value in the predetermined gradation range and converting a second gradation value higher than the first gradation value in the workpiece image into a maximum gradation value in the predetermined gradation range, and generates, for each of the input workpiece images, the output image having the gradation value in the predetermined gradation range by performing gradation conversion on each of the gradation values of the workpiece image using the gradation conversion condition corresponding to the workpiece image, such that output images for the input workpiece images have pixel gradation values within the predetermined gradation range.

2. The image processing apparatus according to claim 1, further comprising:

an input unit configured to receive, from a user, designation of a parameter related to an input image or an output image, wherein the image generation unit determines the predetermined gradation range in accordance with the parameter received by the input unit.

3. The image processing apparatus according to claim 2, wherein the parameter includes a parameter for changing a width of the predetermined gradation range by changing both the maximum gradation value and the minimum gradation value of the predetermined gradation range.

4. The image processing apparatus according to claim 2, wherein the parameter includes a parameter for changing a position of the predetermined gradation range in the entire gradation range while maintaining a width of the predetermined gradation range.

5. The image processing apparatus according to claim 2, wherein the parameter includes a parameter for changing a threshold that is an upper limit value of the second gradation value.

6. The image processing apparatus according to claim 2, wherein the first gradation value is a minimum gradation value of an input workpiece image, and the second gradation value is a maximum gradation value of the input workpiece image.

7. The image processing apparatus according to claim 1, wherein the image generation unit:

for each of the input workpiece images, extracts a low-frequency component of the workpiece image and generates the gradation conversion condition based on the low-frequency component; and performs the gradation conversion on the low-frequency component using the gradation conversion condition based on the low-frequency component, and generates the output image based on the low-frequency component after the gradation conversion.

8. The image processing apparatus according to claim 7, wherein the image generation unit:

for each of the input workpiece images, further extracts a high-frequency component excluding the low-frequency component, and applies a gain calculated from the gradation conversion condition based on the low-frequency component to the high-frequency component; and generates the output image based on the low-frequency component after the gradation conversion and the high-frequency component applied with the gain.

9. The image processing apparatus according to claim 7, further comprising:

an input unit configured to receive, from a user, designation of a parameter when the image generation unit extracts the low-frequency component, wherein the image generation unit extracts the low-frequency component having a magnitude corresponding to the parameter received by the input unit.

10. The image processing apparatus according to claim 1, wherein the image generation unit generates the workpiece image by synthesizing a plurality of images obtained by sequentially imaging the same workpiece by the imaging unit.

11. The image processing apparatus according to claim 1, wherein if the input workpiece image is a color image, the image generation unit generates the output image by converting a saturation of pixels having a gradation value equal to or less than a first threshold among pixels in the workpiece image into a predetermined value or less.

12. The image processing apparatus according to claim 11, wherein if the input workpiece image is a color image, the image generation unit generates the output image by continuously converting a saturation of pixels having a gradation value larger than the first threshold and equal to or less than a second threshold in the workpiece image, in accordance with the gradation value.

13. The image processing apparatus according to claim 1, wherein the predetermined gradation range has a minimum and a maximum gradation value that are common to each of the output images for the input workpiece images.

14. An image processing apparatus comprising:

a camera configured to acquire input workpiece images of a workpiece;

one or more processors; and a non-transitory computer-readable medium storing instructions that, when executed by the one or more processors, cause the one or more processors to:

generate, for each of the input workpiece images, a gradation conversion condition for converting a first gradation value in the input workpiece image into a minimum gradation value in the predetermined gradation range and converting a second gradation value higher than the first gradation value in the workpiece image into a maximum gradation value in the predetermined gradation range, and generate, for each of the input workpiece images, an output image having the gradation value in the predetermined gradation range by performing gradation conversion on each of the gradation values of the workpiece image using the gradation conversion condition corresponding to the workpiece image, such that output images for the input workpiece images have pixel gradation values within the predetermined gradation range.

15. The image processing apparatus according to claim 14, wherein the non-transitory computer-readable medium further stores instructions that, when executed by the one or more processors, cause the one or more processors to:

receive, via an input unit, a parameter related to an input image or an output image, and determine the predetermined gradation range in accordance with the parameter.

16. The image processing apparatus according to claim 14, wherein the non-transitory computer-readable medium further stores instructions that, when executed by the one or more processors, cause the one or more processors to:

for each of the input workpiece images, extract a low-frequency component of the workpiece image and generate the gradation conversion condition based on the low-frequency component, and perform the gradation conversion on the low-frequency component using the gradation conversion condition based on the low-frequency component, and generate the output image based on the low-frequency component after the gradation conversion.

17. The image processing apparatus according to claim 14, wherein the predetermined gradation range has a minimum and a maximum gradation value that are common to each of the output images for the input workpiece images.

18. A non-transitory computer-readable medium storing instructions that, when executed by one or more processors of an image processing apparatus having a camera configured to acquire input workpiece images of a workpiece, cause the one or more processors to:

generate, for each of the input workpiece images, a gradation conversion condition for converting a first gradation value in the input workpiece image into a minimum gradation value in the predetermined gradation range and converting a second gradation value higher than the first gradation value in the workpiece image into a maximum gradation value in the predetermined gradation range, and generate, for each of the input workpiece images, an output image having the gradation value in the predetermined gradation range by performing gradation conversion on each of the gradation values of the workpiece image using the gradation conversion condition corresponding to the workpiece image, such that output images for the input workpiece images have pixel gradation values within the predetermined gradation range.

19. The non-transitory computer-readable medium according to claim 18, wherein the instructions, when executed by the one or more processors, further cause the one or more processors to receive, via an input unit, a parameter related to an input image or an output image, and determine the predetermined gradation range in accordance with the parameter.

20. The non-transitory computer-readable medium according to claim 18, wherein the predetermined gradation range has a minimum and a maximum gradation value that are common to each of the output images for the input workpiece images.

* * * * *